United States Patent Office 2,816,041
Patented Dec. 10, 1957

2,816,041

BINDER FOR SAND CORES AND MOLDS

Franz Rudolf Moser, Hausen, near Brugg, Switzerland

No Drawing. Application December 6, 1954,
Serial No. 473,439

7 Claims. (Cl. 106—38.7)

For the production of complicated cores, the foundry industry generally employs cold setting binders having the property to allow setting of the sand core while still in the core box. Such binders are above all drying or semi-drying oils, such as linseed oil, wood oil, oiticica oil, dehydrated castor oil, soya oil, grape seed oil, perilla oil, sunflower oil, poppy seed oil and similar oils or oil mixtures which may contain dryers, and which may be blown, bodied, isomerised or treated or modified in other known manner. Disadvantages of these oil binders are the relatively long hardening time of the cores produced by the aid of these binders and the fact that hardening within proper time only occurs when carefully dried and warm sand is used. Another type of cold setting binders based on synthetic resins, it is true, facilitates a quicker setting but besides the high price has the disadvantage of frequently causing dermatitis, and furthermore of producing bad smelling and toxic gases on baking and pouring.

It has already been suggested to reduce the setting time, i. e. the time required for hardening of such sand cores and sand molds produced by means of cold setting binders, by the addition of small quantities of compounds containing the peroxyde group —O—O—. By this measure a substantial reduction of the hardening time has especially been achieved with drying and semi-drying oils containing dryers.

The present invention is based on the observation that certain substances showing the usual peroxyde reaction— blue colouring of starch with potassium iodide and glacial acetic acid—in which the presence of the —O—O— group, however, has not been established may also be used as accelerators.

It has been found that the salts of the chlorous acid, viz. the chlorites of the general formula $XClO_2$, X being an inorganic kation, when used in very small quantities are able to accelerate and regulate the setting of sand cores and molds which are produced by means of drying and semi-drying oils as binding agent.

Suitable for carrying out the present invention is for instance the commercially available sodium chlorite as well as the easily prepared silver and lead chlorites.

The quantity of the chlorites to be added may be very small and will generally amount to 0.01 to 5%, calculated on the weight of the oil. Preferably about 0.01 to 2% chlorite are used.

In order to facilitate handling of such small quantities, the chlorite may be mixed with a suitable inert extender, such as quartz flour.

For carrying out the present invention drying or semi-drying oils are quite generally suitable. These oils may be heat bodied, blown, isomerised or fractionated for instance by use of selective solvents or treated or modified in other known manner. The oils to be used may be glycerol esters as well as corresponding esters of other polyvalent alcohols such as for instance pentaerythritol, dipentaerythritol, sorbitol, trimethylol propane, tri-methylol ethane. One or several oils either as a mixture or as a composition may be used. Oils having conjugated double bonds are often preferable because of their improved drying capacity.

Dryers may be added to the drying or semi-drying oils to be used for the present process in known manner, suitable dryers being for example oil soluble compounds of manganese, lead, cobalt, zircon and cerium.

The accelerator according to the present invention may be added in any stage of the production of the mixture of sand and binder to be used for the cores. For instance, firstly the accelerator may be admixed to the core sand in the mixer and then the oil added.

By the addition of chlorites to the drying or semi-drying oils or to the sand mixture to be used for making cores and molds, the setting time of the sand cores may not only be substantially reduced, as has been proved, but also even regulated at will within broad limits. At the same time the undesired susceptibility to humidity disappears and the drying or semi-drying oils modified according to the present invention frequently show an increased setting capability in the presence of small quantities of humidity. Prewarming of the sand is no longer required.

*Example 1*

To 100 kg. quartz sand are added: 3 kg. blown linseed oil containing 0.1% cobalt and 0.3% lead as naphthenates and thereafter 100 g. of a mixture of quartz flour with 10% lead chlorite, whereupon the whole is thoroughly mixed. It is also possible to proceed in such manner that firstly the sand is put into the mixer and shortly mixed with the accelerator mixture whereupon the oil is added and mixing continued for some time. A test core made from this mixture when measured on the instruments developed by the Steel Works formerly Fischer at Schaffhausen, Switzerland, already after 5 hours showed a shearing strength of 950 g./cm.$^2$ at room temperature, whereas a sand mixture produced in the same manner, however, without accelerator showed only 570 g./cm.$^2$ after the same time.

*Example 2*

In the following claims the term "chlorite" is to be understood in a purely chemical sense, therefore not including the mineral, chlorite.

If the procedure is like in Example 1, however, the linseed oil is replaced by oiticica oil and a mixture of quartz sand containing 10% sodium chlorite instead of a mixture of quartz sand containing 10% lead chlorite is used, the following results are obtained:

| | Shearing strength | |
|---|---|---|
| | after 2 hours | after 5 hours |
| without sodium chlorite | not yet measurable | 800 g./cm.$^2$ |
| with sodium chlorite | 1,000 g./ cm.$^2$ | 2,000 g./cm.$^2$ |

What I claim is:

1. Binder for sand cores consisting essentially of a fatty oil selected from the group consisting of drying and semi-drying oils and a content of 0.01 to 5% of the weight of the oil of a chlorite selected from the group consisting of sodium chlorite, silver chlorite and lead chlorite.

2. Binder for sand cores consisting essentially of a fatty oil selected from the group consisting of drying and semi-drying oils, which oil contains a dryer, and a content of 0.01 to 5% of sodium chlorite calculated on the weight of the oil.

3. Binder for sand cores consisting essentially of a heat bodied oil selected from the group consisting of drying and semi-drying oils and a content of 0.01 to 5% of the weight of the oil of a chlorite selected from the group consisting of sodium chlorite, silver chlorite and lead chlorite.

4. Binder for sand cores consisting essentially of a blown oil selected from the group consisting of drying and semi-drying oils and a content of 0.01 to 5% of the weight of the oil of a chlorite selected from the group consisting of sodium chlorite, silver chlorite and lead chlorite.

5. Binder for sand cores consisting essentially of a fatty oil selected from the group consisting of drying and semi-drying oils and being characterized by the presence of conjugated double bonds, and a content of 0.01 to 5% of the weight of the oil of a chlorite selected from the group consisting of sodium chlorite, silver chlorite and lead chlorite.

6. Binder for sand cores consisting essentially of a fatty oil selected from the group consisting of drying and semi-drying oils and a content of 0.01 to 2% of sodium chlorite calculated on the weight of the oil.

7. Binder for sand cores consisting of oiticica oil containing 0.1% of cobalt and 0.3% of lead as naphthenates and 0.3% of sodium chlorite.

References Cited in the file of this patent
UNITED STATES PATENTS

| | | |
|---|---|---|
| 2,007,958 | Aver | July 16, 1935 |
| 2,556,335 | Moser | June 12, 1951 |

OTHER REFERENCES

Mellor: Vol. III, pages 283–4, pub. 1922 by Longmans Green, "Comprehensive Treatise on Inorganic and Theoretical Chemistry."